FRITHJOF N. MASTRUP
ROBERT S. WITTE
RALPH F. WUERKER
INVENTORS

BY
ATTORNEY

Fig. 2

FRITHJOF N. MASTRUP
ROBERT S. WITTE
RALPH F. WUERKER
INVENTORS

BY
ATTORNEY

FRITHJOF N. MASTRUP
ROBERT S. WITTE
RALPH F. WUERKER
INVENTORS

BY

ATTORNEY

Fig. 5

United States Patent Office 3,387,227
Patented June 4, 1968

3,387,227
HIGH INTENSITY ELECTRICALLY ENERGIZED GAS DISCHARGE LIGHT SOURCE PARTICULARLY ADAPTABLE FOR PUMPING LASER SYSTEMS
Frithjof N. Mastrup, Manhattan Beach, Robert S. Witte, Torrance, and Ralph F. Wuerker, Palos Verdes Estates, Calif., assignors to TRW Inc., a corporation of Ohio
Filed Dec. 2, 1963, Ser. No. 327,388
28 Claims. (Cl. 331—94.5)

ABSTRACT OF THE DISCLOSURE

A high energy light source particularly adapted to pump a laserable material wherein a pair of electrodes are positioned at the ends of a pressurizable annular arc discharge passageway which is formed by first and second substantially cylindrical members, one positioned within the other. The walls of at least one of the members is formed in part of an arc responsive gas evolving material. A ballast means which consists of a chamber connected to a means for maintaining a pressure, substantially less than atmospheric, in the chamber and is connected to the passageway so as to evacuate the evolved gases and arc discharge products each time the lamp is fired.

---

The present invention relates to improvements in apparatus for generating optical frequency radiation and more particularly to a high intensity electrically energized gas discharge light source useful for optical pumping of laser system, and to coherent radiation generating laser systems which include such a light source.

This invention relates more particularly to laser systems requiring optical pumping utilizing either solid laser materials, such as pink ruby, neodymium doped glass, etc. or laser materials which can be encapsulated, for example, liquids, gases, vapors. To be classified as a laser material, these must be capable of stimulated emission of radiation to produce a narrow beam of coherent light. Laser systems of this type are of interest, for example, in optical radar and ranging systems. For these purposes, they are sometimes advantageous because they enable narrow beam operation over extreme distances as required, for example, in space vehicle applications. Other important applications include the metal working arts such as welding machining and the like.

As is well known in the art, coherent radiation generation by lasers is based on induced transition of atoms of the laser media between different quantum energy levels or states. Coherent radiation is generated when atoms or molecules having a higher energy state make a transition to a lower energy state and thereby release energy in the form of optical radiation. In the case of ruby, at least three distinct energy levels are utilized. The atomic systems are "pumped" from the lower or ground state to the higher of three energy levels by pumping light from a high intensity isotropic light source which desirably should have a high concentration of energy in the wavelength range from 3500 Angstroms to 6000 Angstroms. When a preponderance of the atomic systems of the laser crystal have been pumped to the higher energy level by radiation from such a light source a condition arises in which the optical gain of the laser crystal reaches or exceeds 1.0 so that optical frequency oscillation takes place in the optical cavity and a high intensity pulse of coherent radiation is produced. The art of generating high power beams or pulses of coherent light by laser elements such as ruby has created a need in the art for improved "pumping" light sources having higher integrated intensity, shorter pulse duration, and improved geometries suitable for efficient illumination of the optically active laser material.

Accordingly, it is a general object of the present invention to provide a pumping light source capacle of producing radiant flux densities exceeding those of the various devices known heretofore.

It is another object of the present invention to provide apparatus of the type described capable of generating coherent radiation pulse power peaks of the order of five to 100 watts.

It is a further object of the present invention to provide a laser system capable of producing coherent radiation output pulses which individually have energies of the order of 500–2000 joules or more.

It is still another object of the present invention to provide a lamp particularly adapted for radiation pumping of population inversion conditionable mediums and adapted to irradiate such mediums with radiant flux densities of the order of a million watts per square centimeter in response to electrical input energies of the order of $10^5$ joules in periods of the order of 20–200 microseconds.

It is an additional object of the present invention to provide an improved gas discharge lamp which is substantially immune to the wall darkening or contamination which commonly arises from condensation of arc discharge products on the interior surfaces of the envelopes of prior art gas discharge lamps.

It is an additional object of the invention to provide an improved apparatus for generation of coherent radiation which embodies a novel active laser element having improved power handling capabilities.

It is still an additional object of the present invention to provide improved arrangements for extracting undesired heat energy from active laser elements.

Heretofore pumping of ruby lasers has generally been accomplished by the use of conventional gas discharge lamps of the high intensity photographic flash lamp type. One common prior art arrangement (as shown and described, for example, in Lasers by Lengyel, John Wiley and Sons, New York, 1962, at p. 23, Figure 3) is to surround a cylindrical ruby rod with a helical flash lamp. Another prior art arrangement, as shown at p. 23, Figure 25, of Lengyel uses cylindrical gas discharge lamps positioned in parallel alignment with the laser at one focal point of an elliptical reflector which also encloses the laser element. Such flash lamps have been substantially the only type of light sources which have heretofore been capable of delivering appropriate flux densities in the wavelength ranges suitable for pumping laserable materials. In addition to being extremely limited in peak power capacity, such light sources, because of geometrical considerations, provide notoriously poor optical coupling from the gas discharge to the active laser element. Another disadvantage of most gas discharge lamps is that, when operated at extremely high input power levels, they are subject to photoreduction of the envelope material and consequent deposition of opaque contaminants on the internal walls of the lamp envelope. Such deposition causes wall darkening and deterioration of the light output. The apparatus of the present invention very substantially reduces, if not completely eliminates, the wall darkening problem. In addition, the invention provides a lamp geometry which is capable of handling input energies of the order of $10^5$ joules and which has a very substantially improved efficiency of coupling between the light source and the laserable material.

The foregoing and other objects and features of the present invention will be more clearly apparent from the following description taken with the accompanying drawings, through which like reference characters indicate like reference parts, which drawings form a part of this application and in which.

Figure 1:
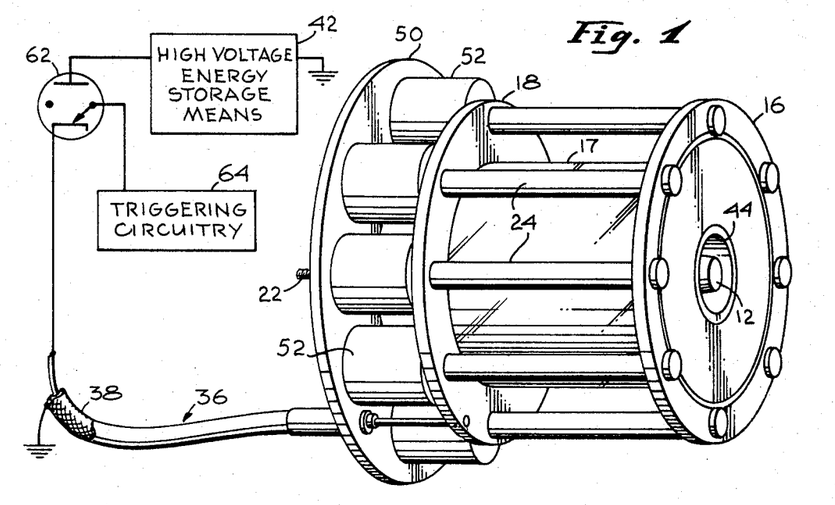
FIGURE 1 is a perspective view of one embodiment of an apparatus in accordance with the present invention.
Figure 2:
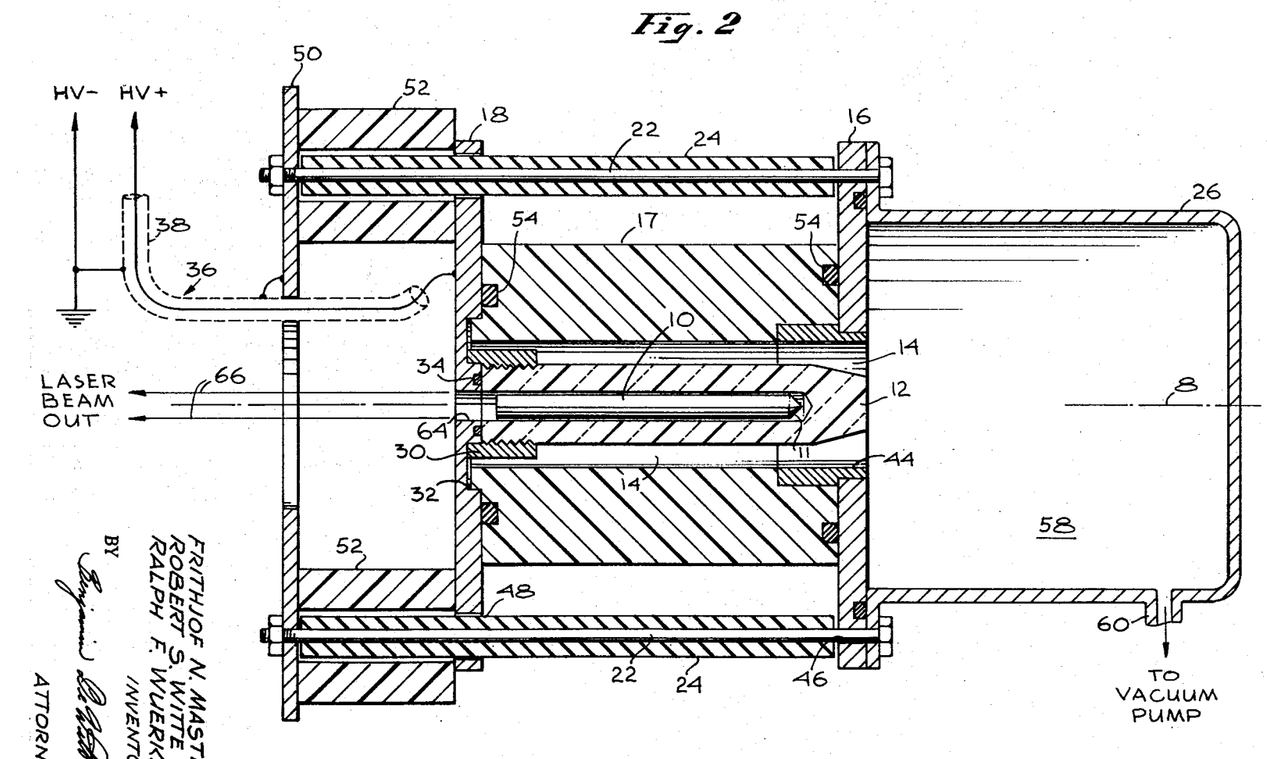
FIGURE 2 is an axial cross-sectional view of the apparatus of FIGURE 1.

There is shown in FIGURES 1 and 2, by way of example, one embodiment in accordance with the present invention in which an active laser element 10 is pumped by means of isotropic black body radiation from an electrically energized ultra high temperature, short duration gas discharge. The principal components of the apparatus are a pair of spaced annular electrodes 30 and 44 between which there extends an annular arc discharge passageway 14 peripherally enclosed by a preferably cylindrical insulating member 17. Internally the passageway 14 is defined by a transparent insulating member 12 which supports the active laser element 10 in a nearly optimum position for illumination of the same by pumping radiation from the arc discharge. The laser element 10 is made from a laserable material such as a ruby rod. In accordance with a presently preferred form of the apparatus at least one of the insulating members 12 and 17 is formed of an arc responsive gas evolving material such as plexiglass. The arc discharge passageway 14 is connected to the evacuated chamber 58 thus providing an evacuated region in the arc discharge passageway. When voltage is applied to the system a sliding spark is initiated along the wall of the passageway 14. More specifically, application of initiating potential to the apparatus is controlled by means of a high voltage ignitron 62 which is in turn connected to be triggered by a conventional triggering circuit 64. When the ignitron 62 is triggered high voltage is applied from energy storage means 42 through coaxial cable 36 to the end plate 18 and therefore to the electrode 30. The electrode 30, along with end plate 18, seal off one end of passageway 14, making the passageway pressurizable. The high voltage applied across electrodes 30 and 44 first initiates a sliding spark along the walls of the discharge passageway 14 which evolves a small amount of gas from the wall material. That gas serves as a carrier for an immediately following high intensity gas discharge in which most of the stored electrical energy is dissipated. The current in the arc discharge passageway rises to several thousand amperes within less than a microsecond so that the gas in the passageway is heated to a temperature of the order of at least 15,000 to 20,000° Kelvin. This high temperature gas within the arc discharge passageway emits isotropic radiation substantially conforming to the spectral distribution of a black body having the same temperature. Thus, high intensity optical radiation is propagated inwardly through transparent member 12 and into the laser rod 10 where the radiation is absorbed to pump the active molecules from the ground state or lower energy level to the upper energy levels.

The laser rod 10 is provided at its right hand end with an integral reflecting roof prism 11 and at its left hand end with a conventional dielectric reflecting surface so that the laser rod itself comprises a multiple reflection optical cavity. It will be obvious to persons skilled in the art that the placement of the reflecting surfaces against the ends of the laser rod is not limiting and the reflectors may be placed outside of the apparatus shown to form the optical cavity. As the laser rod is pumped to a condition where a preponderance of active molecules are in an upper energy state, the optical absorption of the active molecules decreases and the light generated by stimulated emission increases until the internal gain of the crystal rises about 1.0. At this time stimulated emission within the laser rod 10 becomes regenerative and optical frequency oscillation takes place to produce a high intensity coherent radiation beam which exits from the apparatus through central aperture 64 of end plate 18 and axially outward as indicated at 66.

For purposes such as optical radar and the like, it is desirable that the coherent radiation output pulse be of short duration (at least as short as 20 to 100 microseconds and in some systems preferably about one microsecond) and that the laser have a peak emission of the order of megawatts. To achieve such power levels it is necessary that the pumping light input to ruby rod 10 be of extremely high intensity and of short duration. Pumping light pulses of relatively low intensity and long duration as heretofore produced by prior art flash tubes result in the generation of a less intense coherent laser light output pulse or else in a plurality of time spaced laser pulses. The apparatus of the present invention is particularly advantageous in that it enables production of a gas discharge having a time duration of the order of 20–100 microseconds.

Figures 6, 7, 8:
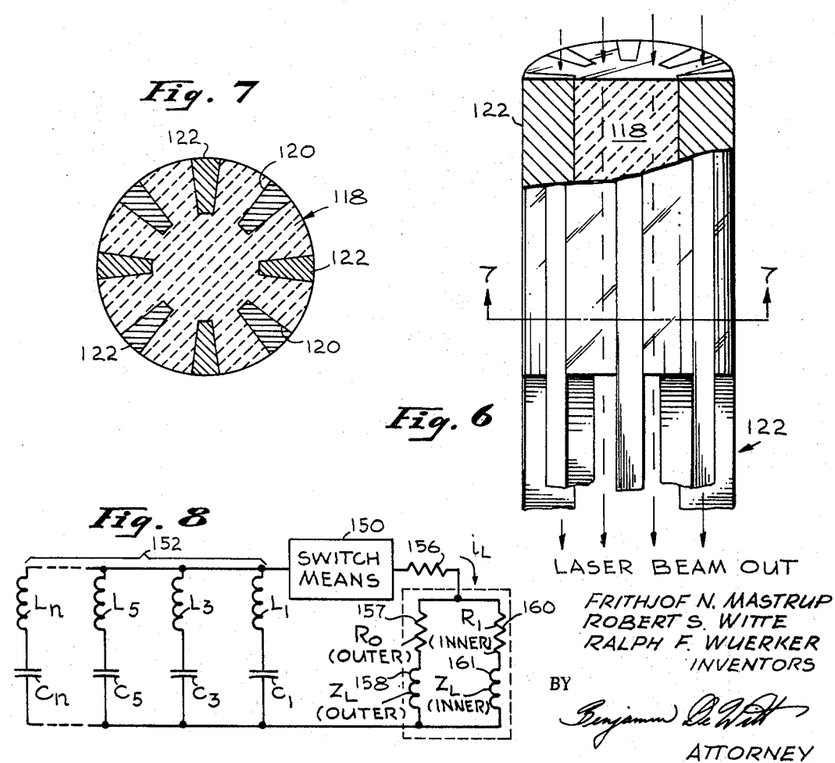
FIGURE 6 is an enlarged view, partly in section of the active laser element used in the apparatus of FIGURE 5.
FIGURE 7 is a cross-sectional view taken along lines 7—7 of FIGURE 6.
FIGURE 8 is a schematic diagram illustrating a preferred form of electrical energy storing apparatus for supplying current to apparatus as illustrated in FIGURES 1 to 7.

In order to produce the rapid gas discharge as indicated above the apparatus shown in FIGURES 1 and 2 should have an extremely low inductance so that the current pulse in the discharge path has a leading edge rate of change of the order of $6 \times 10^{11}$ amperes per second. To this end the energy storage means 42 preferably incorporates a pulse generating network as illustrated in FIGURE 8 and described in more particular detail hereinafter. By consideration of FIGURES 1 and 2 it will be observed that the inductance of the lamp structure is kept to a minimum by utilization of a coaxial arrangement. That is, the discharge current passes from anode electrode 30 to cathode 44, radially outward through the end plate 16, and thence through shunt connected bolts 22 to the connector plate 50. Accordingly, electromagnetic fields generated by the intense gas discharge within the passageway 14 are contained within the cylindrical space defined by the bolts 22. For clarity of illustration, FIGURE 1 shows only a single coaxial conductor 36. In actual practice, it has been found desirable to utilize a plurality (three or more) coaxial cables equi-distantly spaced around the plate 50 and extending, in parallel, outwardly from the plate 50 for connection together to the high voltage source at a distant point. This preserves the coaxial configuration of the electrical network and thereby substantially reduces both the resistance and inductance of the external circuit.

The foregoing has described the principal components and basic operation of the apparatus of FIGURES 1 and 2. For completeness, the following paragraphs specify the structural details of one apparatus, conforming to FIGURES 1 and 2 which we have successfully used. It should be understood that these particulars are given by way of example only and that the apparatus is susceptible of practically unlimited modification of these following relatively unimportant structural details.

The apparatus as a whole is preferably a figure of revolution with the principal components being cylindrical members. As stated heretofore, the laser rod 10 is carried in and supported by an elongated cylindrical insulating member 12 having an appropriate longitudinal aperture. The left hand end of the dielectric member 12 is threaded into electrode 30 which preferably is welded at its other end to a shoulder 32 on the inner face of end plate 18. Electrodes 30 and 44 preferably are formed of either stainless steel or tungsten so that they are fairly immune to deterioration in the presence of arc discharges. Dielectric member 12 is sealed to the shoulder 32 by means of an O-ring 34. The foregoing structure is peripherally enclosed by an insulating member 17 which has an inner diameter about 1/4" larger than the outer diameter of member 12 so that annular passageway 14 is about 1/8" thick.

The end plate 18 of the assembly is connected by way of a coaxial conductor 36 to the positive terminal of energy storage means 42. Thus electrode 30 forms the anode of the annular gas discharge in passageway 14. The cathode electrode 44, which preferably is a cylindrical stainless steel insert is pressed into the right hand end of dielectric member 17 in a manner to intimately engage the inside wall thereof, and is welded into a central aperture in the right hand end plate 16. The end plates 16 and 18 are held together structurally by a plurality of steel bolts 22, circularly spaced around the outside edge of the end plate 16 and extending through appropriate apertures 46 and 48 in the end plates. The apertures 46 are just large enough to receive the bolts 22 and thus the bolts 22 are electrically connected to the end plates 16 and to the cathode 44. Each bolt 22 carries an external insulating sleeve 24 formed of a material such as nylon or "Tygon" to provide a high voltage insulation between the bolts and the anode end plate 18. That is, the peripherally spaced holes 48 in the end plate 18 are large enough to receive the insulating sleeves 24 so that the insulating sleeves extend through plate 18 and terminate adjacent a connector plate 50 at the left hand end of the assembly. The bolts 22, of course, extend through the connector plate 50 and draw the same toward the end plates 18 and 16. Connector plate 50 is electrically insulated from and spaced from the anode end plate 18 by a plurality of cylindrical plexiglass insulators 52 through which the bolts 22 individually extend. Thus the bolts 22 hold connector plate 50 in position relative to the cathode end plate 16, and the insulators 52 maintain a fixed spacing between the connector plate 50 and the anode end plate 18. Dielectric member 17 is sealed to the end plates 18 and 16 by conventional O-rings 54 and 56 disposed in appropriate grooves in the end faces of the dielectric member 17.

THE PLENUM CHAMBER CONCEPT

One of the outstanding advantages of apparatus in accordance with our invention is that the passageway 14 is open on at least one end (the right hand end as shown in FIGURE 2) to permit expulsion of the evolved gases so that pressure excursions in the passageway 14 are limited. Thus, it is not necessary to confine arc discharge products in the passageway 14, the use of massive structures may be avoided and contaminants formed by the arc discharge are removed from the light generating region. It has been found desirable to at least partially evacuate the passageway 14 between successive pulsatory operations of the apparatus. To that end the apparatus has at its right hand end a cylindrical ballast tank 26 which is sealed to the end plate 16 and provides a large evacuated plenum chamber or ballast space 58 into which the passageway 14 opens through the central aperture 45 in cathode 44. The ballast tank 26 is preferably connected as indicated at 60 to a conventional vacuum forepump (not shown) so that a pressure substantially lower than atmospheric is maintained within the space 58 at all times.

It is important to fully appreciate the purposes and advantages of providing a plenum chamber such as ballast tank 26 in apparatus in accordance with our invention. The evacuated ballast tank 26 preferably has a sufficient volume for introception of the gas evolved during a single discharge without building up appreciable pressure within the ballast space 58. Specifically, the volume of the tank 26 should be at least ten or twenty times that of passageway 14 and large enough so that during a given arc discharge, at the selected electrical operating parameters, the pressure within tank 26 will not rise to atmospheric. In addition to limiting pressure excursion, the ballast tank 26 operates to quickly exhaust all discharge products and contaminants from the passageway 14 and thereby avoids the deposition of opaque or light absorbing contaminants on the transparent inner wall member 12. It should be particularly noted that this concept of using a plenum chamber or ballast space 58 to immediately recieve contaminants which are boiled off the walls of an arc discharge device is not restricted to devices which use walls of gas evolving material and is not restricted to the specific embodiments described herein. Rather the concept is broadly applicable to substantially any and all types of gas discharge light sources. In any type of gas discharge lamp a ballast volume, such as the space 58, which is arranged to freely communicate with the arc discharge passageway will operate to minimize the pressure rise in the lamp. This of course greatly simplifies the problem of manufacturing gas discharge lamps with walls strong enough to withstand the pressures commonly developed during high temperature, high energy operation. In conventional prior art thermal light sources, the pressure builds up in direct proportion to the temperature because of the fact that the lamp contains a fixed quantity of gas. Thus the concept of using a ballast chamber is applicable to substantially all classes of flash lamps whether tubular, helical, or annular, and regardless of the type of gas which is used in the lamp or the means used to insert the gas in the lamps. Provision of a low pressure ballast means in combination with any such lamp results in a very substantial improvement in efficiency, lifetime and permissible electrical ratings of the lamp.

SPECTRAL MATCHING CONSIDERATIONS

Figure 3:
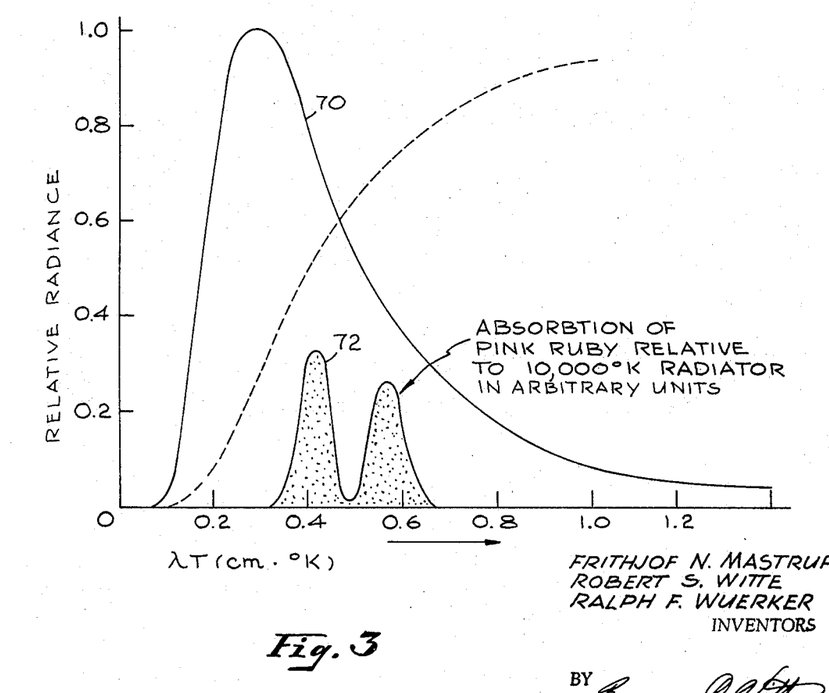
FIGURE 3 is a graph of radiation intensity as a function of normalized wavelength illustrating the spectral relationship, the absorption characteristic of pink ruby and black body radiation of a 10,000° Kelvin radiator.

It is to be noted that the efficiency of lamps used for pumping lasers can be greatly increased by improving the spectral efficiency of the light source. That is, most solid state laserable materials are capable of usefully absorbing pumping radiation only within certain specific wavelength ranges. It is advantageous to maximize the light power output of the light source within the wavelength range of interest. FIGURE 3 illustrates the absorption characteristic of pink ruby normalized to a 10,000° Kelvin radiator. Specifically, in FIGURE 3, the abscissa represents relative absorptivity or relative intensity and the ordinate represents wavelength normalized to a particular temperature (10,000° K.). Curve 70 illustrates the classical black body spectral energy distribution characteristic. That is curve 70 shows the dependence of the radiant flux density (watts/cm.$^2$ per micron interval). Curve 72 illustrates the two absorption bands of pink ruby relative to a 10,000° K. black body and demonstrates that for maximum spectral efficiency a black body radiation source of 15,000 to 20,000° K. should be used. It is to be noted that those temperatures give best efficiency and not maximum radiant flux density, within the ruby absorption bands, at the surface of the laser rod.

The major reason for the choice of a laser pumping source based upon the radiation from a high temperature plasma results from the fact that the radiant flux from these sources can be made astronomical as a result of the extreme temperatures which can be generated. Temperatures approaching 100,000° K. can be generated by high current electrical discharges. The emissivities of the plasma approaches unity and the plasma as a whole radiates as a black body on the long wavelength side of the Wein peak.

Annular light sources, such as that illustrated in FIGURES 1 and 2, can be controlled to provide substantially any desired black body temperature by variation or selection of the electrical parameters of the apparatus. Where low power coherent output pulses are desired (with improved spectral efficiency in the transfer of pumping radiation to the laser element) the electrical circuit values and the design parameters of the lamp structure may be varied to operate in the 15,000 to 20,000° Kelvin black body temperature range. The ability to control the black body operating temperature of lamps in accordance with the present invention means that such lamps can be advantageously used for pumping laser materials other than ruby. This applies particularly to laser materials which necessarily must be pumped with ultra violet radiation. One example of such a laser material is gadolinium which requires pumping radiation at about 2700 Angstroms. Specifically, other laser materials to which the pumping light sources of our invention are thought to be applicable include, for example, trivalent neodymium doped calcium tungstate ($CAWO_4:Nd_3$) neodymium doped silicate glasses, and trivalent gadolinium in a glass or crystalline host material.

Figure 5:
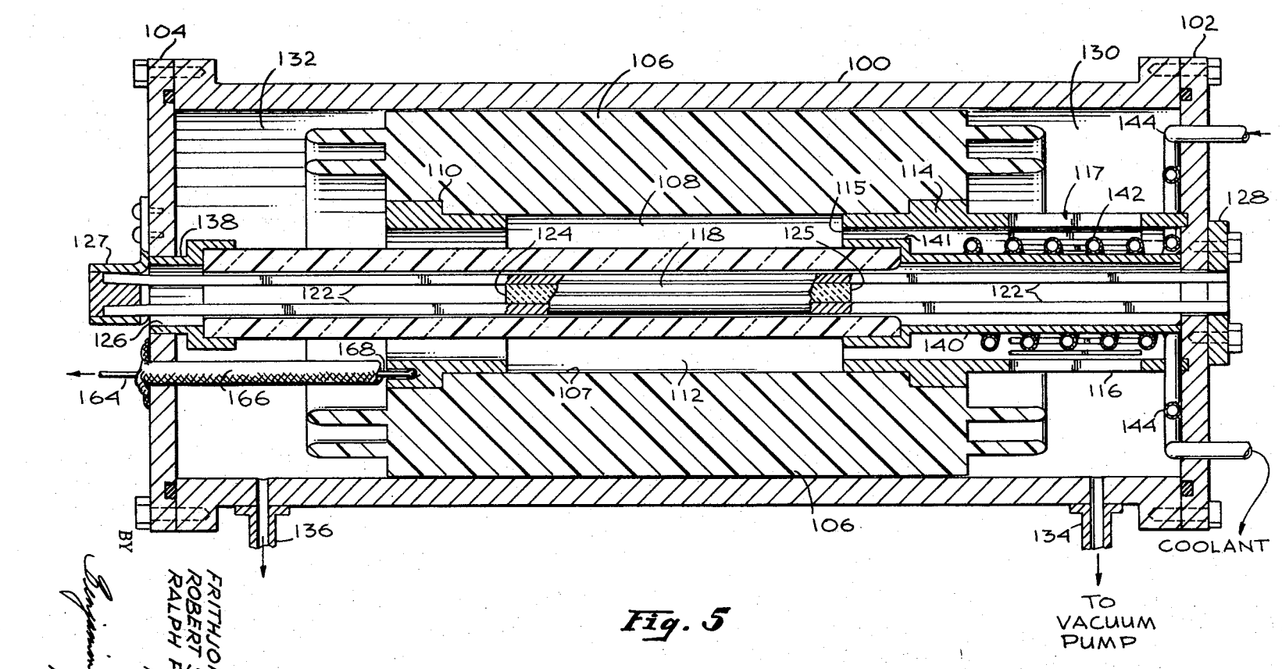
FIGURE 5 is an axial cross-sectional view of an embodiment which utilizes the triaxial current path configuration shown in FIGURE 4c.

While the embodiment of the present invention illustrated in FIGURES 1 and 2 is entirely satisfactory and has been successfully used for pumping laserable material it has certain limitations which may be troublesome where it is desired to develop total pumping radiation power levels of the order of 50 to 100 million watts. Accordingly, there is illustrated in FIGURES 5, 6 and 7 a further embodiment of apparatus in accordance with the present invention which is particularly advantageous for developing black body radiation temperatures of the order of 60,000° Kelvin and for producing pumping radiation flux densities of $10^5$–$10^6$ watts per square centimeter for pulse time durations of 20–30 microseconds. Before proceeding to consideration of the structure illustrated in FIGURES 5, 6 and 7, it is well to briefly consider some of the problems solved by this apparatus.

Firstly, where radiant flux densities of the order noted above are to be generated excessive heating of the laser rod is possible. As discussed in more detail hereinafter, it is known that critical population inversion of ruby cannot be achieved if the ruby rises to temperatures exceeding about 75 degrees centigrade. Accordingly, an apparatus for extreme power levels should provide for cooling the laserable material to low initial temperatures so as to maximize the usable heat capacity of the material.

Secondly, magnetic fields within a laser rod can produce Zeeman splitting of the quantum energy levels of the ruby crystal. That is, if a ruby crystal is immersed in a magnetic field which is non-homogenous over its length, the effect of the field is to lower the gain of the ruby crystal which means that the value of the critical population inversion is increased. Accordingly, for efficient coherent radiation generation in high power apparatus, it is desirable to keep the magnetic fields of the flash lamp out of the region occupied by the laser rod.

Thirdly, it is well known that a simple annular plasma arc discharge configuration is subject to magnetohydrodynamic instabilities. One detailed consideration of such instabilities is set forth, for example, in an article entitled "Finite Resistivity Instabilities of Sheet Pinch" by H. P. Firth and J. Killen, Physics of Fluids, vol. 6, p. 459 (1963). A desirable high intensity flash lamp should use a current configuration which avoids or at least minimizes such instabilities. In addition, current configurations should be used which have the lowest possible circuit impedance so that multi-megawatt electrical pulses having durations of tens of microseconds can be achieved without using excessively high source voltages.

Figure 4A:
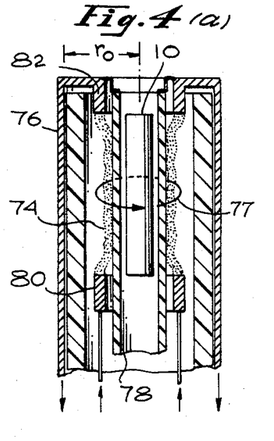
FIGURES 4a, 4b and 4c are diagrammatic illustrations of three different alternative current path configurations which may be embodied in variants of the present invention.

In FIGURE 4a there is diagrammatically illustrated the current path configuration of the apparatus illustrated in FIGURES 1 and 2. This may be conveniently referred to as the "simple annular configuration" in which the annular arc discharge 74 between electrodes 80 and 82 is enclosed by an outside coaxial return current conductor 76. In principle, conductor 76 is a shield enclosing the lamp structure and represents the return current path through the bolts 22 in the apparatus of FIGURES 1 and 2. The current configuration of FIGURE 4a has the advantage from the point of view of maximum and uniform illumination of the laser rod 10 that there are no return current conductors between the annular plasma 74 and the internally positioned laser rod 10. However, the configuration of FIGURE 4a has the disadvantage, when operated at extremely high currents, that the annular magnetic fields develop an inwardly acting magnetic pressure which presses the plasam 74 on to the inner envelope walls 78. Additionally, the inwardly acting magnetic field tends to push the annular plasma sheath off the inside edges of the electrodes 80 and 82, and therefore causes undesirable current concentrations at the inside edges.

Figure 4B:
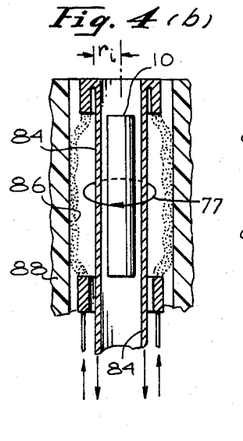
Figure 4C:
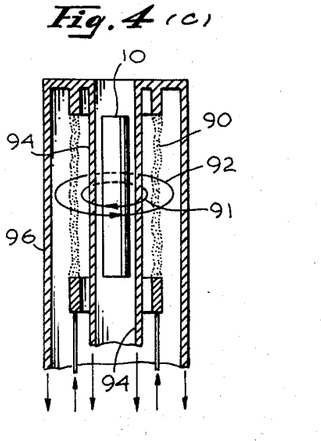

For the simple annular configuration the field increases with decreasing radius and radial pressure varies as the square of the field; accordingly the magnetic flux 77 acts to constrict the plasam sheath 74 against the inner wall member 78 and is unstable in the sense that the constricting force increases as the displacement increases. In addition to producing arc discharge instability the magnetic force produces extreme mechanical loading on the inner coaxial wall member 78 which limits the current capacity and hence the peak light power output of this annular flash lamp configuration. Specifically, it has been shown heretofore that short duration, high current, pulsed coaxial lamps of the simple annular configuration are input power limited by structural failure of the inner quartz envelope. One prior art experiment has shown that with an inner wall member of 2.5 centimeter O.D. and a wall thickness of 4.5 mm., the lamp could withstand only 5,000 joules; at 10,000 joules even an inner wall member 78 having a wall thickness of 7.5 mm., and an inside diameter of 1 centimeter was broken by the constricting magnetic pressure. FIGURES 4b and 4c diagrammatically illustrates two different current path configurations which resolve the foregoing difficulties and which schematically represent alternative arrangements of apparatus in accordance with our invention.

The "internal annular configuration" illustrated in FIGURE 4b is similar in operation to the simple annular configuration discussed above. In this alternative the magnetic pressure between the inner coaxial current conductor 84 and the annular plasma sheath 86 acts to press the plasma discharge onto the outer annular chamber wall 88. The plasma sheath moves in this case, in the direction of decreasing magnetic intensity and pressure. For this reason the discharge configuration of FIGURE 4b is more stable than the simple annular configuration and is useful where the outer wall 88 can be made sufficiently strong. Specifically, in this alternative the outer wall 88 preferably is formed of mechanical shock resistant gas evolving material such as plexiglass, while the inner wall (not shown) through which the pumping radiation is transmitted to the laser rod 10, can be formed of relatively fragile refractory optical materials such as quartz or glass. The outer wall 88 serves as a source of arc evolved gas for self-filling of the lamp in accordance with the concepts discussed heretofore. Another major advantage of the internal angular configuration (FIGURE 4b) is relatively low inductance. Specifically, the inductance can be shown to be $$Z_L = \frac{\mu_o}{2\pi} Ln \frac{r_p}{r_i}$$

where $r_p$ is the radius of the plasma sheath 86, and $r_i$ is the radius of the inner current return conductor 84.

Compared to the simple annular configuration (FIGURE 4a), the internal annular arrangement (FIGURE 4b) has the disadvantage that the current return conductor 84 lies between the luminous plasma 86 and the laser rod 10, and regardless of how the conductor 84 is constructed (e.g. metallic screen) it decreases the efficiency of illumination. In addition, $I^2R$ heating of conductor 84 can act as a second source of crystal heating.

The "triaxial configuration" as shown diagrammatically in FIGURE 4c is an alternative arrangement which incorporates the best features of both the simple annular configuration (FIGURE 4a) and the internal annular configuration. In the triaxial configuration, the plasma sheath 90 is pressed on either side by the counter-directed azimuthal magnetic fields 91 and 92 which are, respectively, generated between the inside surface of the plasma sheath and inner return conductor 94, and between the plasma sheath 90 and outer conductor 96. An important feature of this configuration is that, at some radial distance intermediate the fields 91 and 92 there necessarily exists a cylindrical "surface" at which the magnetic field intensity drops to zero. The location of the cylindrical surface of zero magnetic field intensity determines the equilibrium position of the plasma sheath 90. If the plasma sheath is transiently displaced toward the inner return conductor 94, the outward directed magnetic pressure increases. Conversely, if the plasma is pushed toward the outer conductor 96, the "pinch" force exerted by field 92 predominates. As a result, the annular plasma sheath is stable about the equilibrium position, and the configuration illustrated in FIGURE 4c is substantially immune to the classical magnetohydrodynamic instabilities.

THE APPARATUS OF FIGURE 5

FIGURES 5, 6 and 7 illustrate a structural arrangement of a laser pumping light source which embodies the triaxial current configuration as discussed above. The lamp structure is enclosed within an outer cylindrical housing 100 which preferably is a length of steel tubing. At its ends the housing 100 is closed by circular end plates 102 and 104 which are vacuum sealed to the ends of the housing. The annular lamp structure within the housing comprises a hollow cylindrical outer wall member 106 formed of plexiglass and an inner cylindrical wall member 108 which may be formed of quartz or substantially any other similar transparent refractory material. A cylindrical anode 110 is press fit into the left hand end of the outer wall member 106 and affixed thereto so that its inner edge intimately contacts the plexiglass wall 107 of the discharge passageway 112 to facilitate generation of a sliding spark therealong. A cylindrical cathode 114 is pressed into the right hand end of the outer wall member 106 and includes a tubular portion 116 which extends to the right to engage the end plate 102 and make electrical connection thereto. Tubular portion 116 is slotted longitudinally to permit unimpeded flow of evolved gases from passageway 112 to ballast space 130. It will be appreciated that the operation of the apparatus of FIGURE 5 is substantially the same as described heretofore with respect to FIGURES 1 and 2.

The laser rod 118 is supported in a push fit relation axially within the quartz inner wall member 108 and has its active portion disposed longitudinally between the electrodes 110 and 114 to receive radiation propagated from the arc discharge through the transparent inner wall member. It is to be noted that the arc discharge passageway 112 between electrodes 110 and 114 is the same length as the laser rod. This geometry assures maximum pumping with the available radiative plasma area. The structural arrangement of the laser rod, which enables cooling of the same, is more clearly shown in FIGURES 6 and 7. The ruby rod 118 has a plurality of peripherally spaced, tapered slots 120 in which are affixed a like plurality of elongated conductors 122 preferably formed of material having high heat conductivity and good electrical characteristics such as copper, silver or aluminum. As best shown in FIGURE 5, conductors 122 extend to the left beyond the left hand end of the ruby rod and out through a circular aperture 126 in the end plate 104 where they are held by a removable clamp 127. Similarly, the conductors 122 extend from the right hand end 125 of the ruby rod outwardly through a central aperture in the end plate 102. At this end the conductors 122 are joined together by a centrally apertured copper flange member 128 which is bolted to the end plate 102 so as to form a connection such that the end plate 102 serves as a heat sink for heat which flows from the ruby rod along the conductors 122. In addition, the conductors 122 serve as the inner coaxial conductor 94 (FIGURE 4c) of the triaxial current configuration and shield the ruby from the fields 91 and 92 so that Zeeman splitting of the quantum energy levels is avoided.

The regions 130 and 132 between the respective ends of the plexiglass member 106 and the end plates 102 and 104 serve as plenum chambers or ballast spaces for rapid evacuation of arc discharge products from the passageway 112, and, therefore, are connected to a vacuum forepump (not shown) by conventional vacuum system connectors 134 and 136. Inner wall member 108 is supported coaxially within the apparatus by means of cylindrical Kovar members 138 and 140 which are respectively affixed by well known soldering techniques to the opposite ends of member 108. It is to be noted that this structural arrangement provides a cathode electrode which includes two facing coaxial metallic surfaces 115 and 141 with an annular space therebetween. This arrangement is highly advantageous in that it provides increased cathode surfaces (both of the surfaces 115 and 141) thereby avoiding electron starvation of the arc discharge, and minimizing arc deterioration of the cathode.

The outer cylindrical surface of the Kovar member 140 is provided with a helically wound tube 142 through which a cryogenic fluid such as fluid nitrogen is circulated to assist in cooling wall member 108 and the laser rod. Similarly, the interior wall of the end plate 102 carries coolant tubes 144 for circulation of liquid nitrogen. This improves the heat sink function of plate 102, and more importantly, enables condensation of the arc discharge products which flow into space 130 from passageway 112. Additionally, if desired, either or both of the end plates 102 and 104 may carry a plurality of cryogenically cooled baffle plates (not shown) for enhanced condensation of the arc discharge products.

It is well to emphasize the importance of cooling the laser rod to cryogenic temperatures prior to each successive cycle of operation. The total coherent energy which can be emitted in a single pulse depends on the "critical inversion $N_c$" which is definable as the value of the population density difference $N_2-N_1$, at which stimulated emission can occur. The critical inversion is related to the atomic cross section $\sigma_s$ as:

$$N_2-N_1=N_c=\frac{\sqrt{\epsilon}}{T_d C \sigma_s} \tag{1}$$

wherein:

$\sqrt{\epsilon}$ is index of refraction of the laser rod;

$c$ is the velocity of light;

$\sigma_s$ is the atomic cross section for emission or absorption; and $T_d$ is the Fabry-Perot decay time.

As indicated by Equation 1 the critical inversion varies inversely with the atomic cross section $\sigma_s$. Thus, as $\sigma_s$ decreases with increasing temperature, the critical inversion $N_c$ increases. A temperature exists for any given laser material at which further input pumping energy will not result in an increase in retrievable stored energy. Moreover, an upper limit temperature exists at which coherent emission becomes impossible. It is well known that the maximum temperature to which ruby rod (chromium doped corundum) can be permitted to rise in a practical system is about 75° centigrade. Table I indicates the amount of energy in joules per cubic centimeter which pink ruby can absorb in being raised to 75° C. from various initial pumping period temperatures.

TABLE I

| Initial Temperature, ° K. | Final Temperature, ° K. | Heat Capacity Joules/mole | Heat Capacity Joules/cm.³ |
|---|---|---|---|
| 300 | 350 | 4,225 | 165 |
| 273 | 350 | 6,300 | 246 |
| 240 | 350 | 8,570 | 335 |
| 200 | 350 | 10,910 | 425 |
| 80 | 350 | 13,900 | 542 |

It will be observed from Table I that the heat capacity of the ruby rod is more than tripled by cooling the same to a temperature of about 80° Kelvin prior to each pumping lamp energization.

Thus, for example, a ruby laser rod, such as the rod 18 of FIGURE 5, which is 8″ long and ⅝″ in diameter, would on the basis of internal heating due to transitions from the pumping band to the $R_1$ and $R_2$ fluorescent levels, be capable of yielding only 14,500 joules if started from room temperature compared to a yield of 47,000 joules of coherent energy when initially cooled to liquid nitrogen temperatures. The above are calculated values which are necessarily optimistic because of being based on the assumption of no internal heating of the ruby as the result of absorption of ultraviolet radiation from the annular light source.

In ultrahigh power pumping lamp arrangements such as illustrated in FIGURE 5, the high black body temperatures used necessarily mean that the peak of the Wein curve is well into the ultraviolet range so that the laser rod is subjected to intense irradiation at wavelengths shorter than the useful pumping band. In accordance with the present invention, deleterious heating from such ultraviolet radiation is greatly reduced by using an internal wall member 108 (FIGURE 5) formed of quartz or a similar refractory material which is relatively non-transparent in the ultraviolet range. For example, either Pyrex glass or a thin tube of heavily doped poor optical quality ruby may be provided as an internal liner (not shown) in wall member 108 to act as a shield which reduces heating of the laser rod by ultraviolet radiation.

In addition to cooling the laser rod to cryogenic temperatures between successive cyclical operations of the apparatus, the coolant tubes 142 and 144 cool the Kovar member 140 and inner wall member 108 to relatively low temperatures. Since inner wall member 108 is separated from outer wall member 106 by the evacuated discharge passageway 112, the effect achieved is similar to that of a Dewar flask. Preferably the cylindrical housing 100 has a highly reflecting interior surface to minimize radiative heat transfer thereto from the arc discharge plasma and between housing 100 and the inner wall member 108. The use of such an internal reflective surface improves the thermal isolation of the inner wall member 108 and facilitates cooling member 108 and the laser rod 118 to cryogenic temperatures prior to each successive cyclical operation of the apparatus. As explained at length heretofore, it is extremely advantageous to have the laser rod 118 at cryogenic temperatures immediately prior to pumping in order to give it a maximum heat capacity. It is important to note that this concept of cooling the arc discharge passageway 112 to cryogenic temperatures is a feature of the present invention which cannot be provided in conventional flash lamps such as those described by Lengyel, supra. That is, an ordinary flash lamp cannot be precooled to cryogenic temperatures for the reason that doing so condenses substantially all the gas contained within the discharge device and renders it extremely difficult to initiate. Embodiments in accordance with the present invention which use self filling by evolution of gas from the walls of the discharge passageway can be readily initiated by means of voltages of 10–20 kv. even when the passageway 112 and its walls are at liquid nitrogen temperatures just prior to initiation of the arc discharge.

ENERGY STORAGE CONSIDERATIONS

In FIGURE 8 there is shown a preferred circuit arrangement for energization of the apparatus of FIGURE 5 by means of electrical pulses having peak power levels of the order of 4000 megawatts and delivering energies of the order of 100,000 joules in a time of about 20–30 microseconds with the current pulses having leading edge rise rates of about $6 \times 10^{11}$ amperes per second. While a sine wave generating energy source or a simple capacitor discharge is satisfactory for relatively low power systems in accordance with the invention, the above mentioned electrical parameters make a simulated transmission line type of energy source highly desirable for driving the apparatus of FIGURE 5.

The network shown schematically in FIGURE 8 is formed by the parallel connection of an individual series $L_n$, $C_n$ units each of which is resonant at an odd harmonic of the first section $L_1$, $C_1$. This network has the advantage of incorporating constructively the internal inductance present in the individual capacitors $C_1$, $C_3$ etc. The required load current $I_L$ is generated by summation of the sinusoidal currents flowing in and out of the individual series resonant sections. Design synthesis is based upon Guilliman's technique of the Fourier analysis of the desired continuous wave train from an ideal short-circuited lossless transmission line; namely, $$I(t) = I_o \sum_{\mu+1}^{\infty} b_n \sin \frac{n\pi t}{t} \quad (2)$$

where, in Equation 2:

$$b_n = \frac{2}{t} \int_0^t \frac{I(t)}{I_o} \sin \frac{n\pi t}{t} dt \quad (3)$$

where
$I_o$ is peak current desired;
$b_n$ is the Fourier coefficient of the $n$th section; and
$t$ is the desired pulse duration in seconds.

For the circuit configuration illustrated in FIGURE 8, the inductive and capacitive values of each section are directly determined by the characteristic impedance $Z_o$ and pulse duration $t$; namely, $$L_n/C_n = Z_o/b_n$$

$$\frac{1}{\sqrt{L_n \cdot C_n}} = \frac{n\pi}{t}$$

Fast convergence of Fourier's series is realized by using a structure which generates a trapezoidally rising wave. Table II specifies the component values of an energy source in accordance with FIGURE 8 which provides a 5 microsecond pulse rise time, a 100$\mu$ second duration, and a 0.17 ohm characteristic impedance.

TABLE II

| Section | Resonant Frequency, kc. | Fourier Coefficient, $b_n$ | Capacity, $\mu$ farad | Inductance, $\mu$ henry |
|---|---|---|---|---|
| 1 | 5 | 1,262 | 240 | 4.3 |
| 2 | 15 | 0.407 | 26 | 4.5 |
| 3 | 25 | 0.229 | 8.5 | 4.8 |
| 4 | 35 | 0.147 | 4 | 5.3 |
| 5 | 45 | 0.098 | 2 | 6.2 |
| 6 | 55 | 0.0656 | 1 | 7.5 |
| 7 | 65 | 0.0428 | ⅝ | 9.8 |
| 8 | 75 | 0.0254 | 0.4 | 14 |

The foregoing component values are listed by way of example only. It should be expressly understood that the present invention is not limited to the particular parameters mentioned or to any one of them.

The network of FIGURE 8 has many features which recommend it for driving annular flash lamps such as that illustrated in FIGURE 5. The first advantage is that the circuit can achieve characteristic impedance values less than 0.1 ohm. Secondly, the major fraction of the energy is stored in the $L_1$, $C_1$ section of the network having the lowest frequency thereby allowing the use of "slow" energy storage condensers which have a favorable cost per joule of stored energy. A third advantage is the ease of assembly and ability to vary the form and rise time of the current wave by the simple removal or addition of the low-capacity high-frequency sections.

The switching means 150 of the circuit arrangement illustrated in FIGURE 8, is, for example, a high current, high voltage ignitron discharge device such as for example General Electric Model 7703 or Model 7171. Interconnection between the individual storage capacitors and from the energy storage unit 152 to the lamp structure 154 by way of ignitron switch means 150 preferably is accomplished with shielded coaxial cable such as type RG-14U. As schematically illustrated in FIGURE 8 resistance 156 represents the resistance of the arc discharge between cathode 114 and anode 110 in the apparatus of FIGURE 5. Elements 157 and 158 are schematically representative of the impedance through the outer return current path comprising housing 100 and end plates 102 and 104. Similarly, elements 160 and 161 represent the resistance and inductance of the inner return current path comprising conductors 122. As shown in FIGURE 5 connection of the high voltage circuit from ignitron switch means 150 to the anode electrode 110 is accomplished by means of coaxial cable 164 which has its outer braid connected to the end plate 104 by means of a conventional coaxial cable fitting. The insulated inner conductor of the cable 166 extends through an appropriate hole in the end plate 104 and through the ballast space 132. Center conductor 168 is plugged into an appropriate cylindrical hole in the anode electrode 110.

SUMMARY

In summary, the present invention, as described in particular detail in the foregoing, provides an apparatus for optically pumping lasers with isotropic black body radiation from an electrically energized ultrahigh temperature ($\leq 60,000°$ K.), short duration (20–100 microsecond) gas discharge. The plasma so generated is capable of yielding useful pumping radiation flux densities within the wavelength range at which ruby lasers are absorptive of at least 50–100 megawatts per square centimeter at the surface of the ruby laser rod. Excitation of a ruby laser with that pumping light intensity enables generation of laser light pulses having peak power levels of about 70 megawatts and delivering about 1700 joules of energy within a laser pulse period of about 25 microseconds. The particular embodiment illustrated in FIGURES 5–8 has the additional advantages that it provides low electrical circuit inductance and resistance so that high current short duration discharges can be achieved with moderate tension (10–20 kilovolts) energy storage systems. Further the structural arrangement utilized excludes all generated magnetic fields from the laser material and thereby eliminates Zeeman splitting of the quantum energy levels. Thirdly, the apparatus is contained within a metallic housing so that all generated electric and magnetic fields are contained within the apparatus to eliminate radition of high frequency noise. Fourthly, the laserable element is provided with heat transfer conductors 122 so that it may be cooled to cryogenic temperatures prior to each successive pulse operation to thereby increase the heat capacity of laser rod 118 and the permissible pumping light input energy per pulse.

A further advantage of the apparatus illustrated in FIGURE 5 is that there is an unobstructed light path extending outwardly from the laser rod 118 through both of the end walls 102 and 104. This enables use of apparatus in accordance with FIGURE 5 in laser systems wherein additional devices are included within the optically resonant cavity. For example, the apparatus of FIGURE 5, because of being open at both ends, can be used as an amplifier in the manner taught by United States Patent 2,929,922 issued Mar. 22, 1960, to A. L. Schawlow et al. Likewise, because of that feature of the apparatus of FIGURE 5, it is particularly useful in shuttered laser systems such as those specifically disclosed in copending applications Ser. No. 324,343 and Ser. No. 324,289 filed Nov. 8, 1963, and Nov. 18, 1963, respectively, by G. L. Clark and R. F. Wuerker, both of which are assigned to the same assignee as that of the present invention.

There are many applications where it is *not* necessary to place the end reflectors of the Fabry-Perot resonant cavity outside the pumping lamp housing. In such cases certain additional advantages can be realized by utilization of an apparatus broadly similar to that of FIGURE 5 but which is "open" at one end only and which is provided with a vacuum ballast chamber at one end only. Such a "single-ended" structural arrangement facilitates a number of structural improvements. Specifically, it permits (1) design of the apparatus for easy removal of one electrode for replacement of the gas evolving outer wall member, and (2) cylindrically laminar construction of the outer wall member, so that only a relatively thin inner sleeve portion need be comprised of gas evolving material. One annular lamp apparatus having the above features is illustrated and described in more particular detail in copending application Ser. No. 325,084 (STL 880) filed Nov. 20, 1963, now Pat. No. 3,274,437, by F. Mastrup and assigned to the same assignee as the present invention. Of course, where apparatus generally in accordance with FIGURE 5 is used for pumping of an internally positioned laserable element the outer wall member can be of a cylindrically laminar form regardless of whether the pumping lamp structure is single-ended or double-ended. The laminar construction is, in either case, additionally advantageous in that the peripherally extending mirror surface can be between the innermost (gas evolving) sleeve and the next adjacent cylinder. It can be shown analytically that the efficiency of laser illumination is improved by having the mirror surface as close as possible to the light emitting plasma. Likewise, it will be appreciated that cylindrically laminer construction provides maximum bursting strength in an apparatus of any given diameter. Where a particular application restricts the permissible outside diameter, the use of such construction gives high strength and therefore permits increased energy per pulse ratings.

It is to be noted that apparatus generally in accordance with FIGURE 5, whether single or double-ended, does not inherently or necessarily employ the "triaxial" current configuration of FIGURE 4c. That is, within the scope of our invention we contemplate that such apparatus can be modified, in any one of various ways which will be apparent to persons skilled in the electrical arts, to embody either the simple annular (FIGURE 4a) or the internal annular (FIGURE 4b) current configurations. For example, by simply forming clamp 127 (FIGURE 5) of insulating material the apparatus can be converted to the simple annular (FIGURE 4a) variation. Stated differently, the triaxial apparatus (FIGURES 4c and 5) may be viewed as a combination which inherently includes the subcombination current configurations of FIGURES 4a and 4b.

While the various embodiments in accordance with the present invention as specifically described heretofore have been described as using organic materials such as plexiglass, Teflon and nylon, it should be expressly understood that the present invention is not limited to those specific materials but that a wide range of gas evolving materials may be used.

It has been found that the following specific materials are useful for the gas evolving wall member 106 of the apparatus illustrated in FIGURE 5. These materials are listed by way of example only and it should be expressly understood that the present invention is not limited to the following materials. Among the materials which have been found to have suitable insulating characteristics and gas evolving characteristics are in addition to those mentioned previously, polymethylmethacrylate (plexiglass), polyhexamethylene (nylon), polytetrafluoroethylene (Teflon), polyvinylchloride (Vinylite QYNA), polyethylene (e.g. DE-3401), and ethylcellulose (e.g. Lumarith 22361).

Additionally, it should be understood that the present invention is not limited to the concept of arc initiation by means of a sliding spark along the surface of a gas evolving material. For example, the apparatus of FIGURE 5, within the scope of the present invention can be constructed of refractory insulating elements, rather than plexiglass or the like, in which case initiation of arc discharge within the passageway 112 can be accomplished by means of introducing a small quantity of a rare gas such as xenon into the passageway 112 simultaneously with the application of an energizing potential between the electrodes.

While the present invention has been described with reference to certain specific embodiments only, it will be clear to those skilled in the art that it is not so limited but is susceptible of various other changes and modifications without departing from the spirit and scope of the concepts thereof.

The embodiments of the invention in which an exclusive property or privilege is claimed are defined as follows:

1. In combination:
  a pair of spaced annular electrodes;
  circuit means for applying potential between said electrodes to produce arc discharges therebetween with the time between successive discharges being relatively long as compared to the time duration of a given discharge;
  first and second substantially coaxial insulating members extending from one of said electrodes to the other with said first member being positioned within said second member to define and form a pressurizable and substantially annular arc discharge passageway in which said arc discharges occur;
  at least one of said insulating members having passageway wall portions which include an electric arc responsive gas evolving substance for self-filling of said discharge passageway so that the same is enabled, within a time of the order of microseconds, to support an ionized gas discharge current of at least several thousand amperes, said first member substantially transparent to the radiated energy of said ionized gas;
  evacuation means connected to said defined passageway to provide a pressure substantially lower than atmospheric in said passageway prior to the next successive arc discharge; and
  a laserable material positioned substantially in coaxial alignment within said first member for receiving energy radiated from the ionized gases within said passageway.

2. In an apparatus for generating coherent optical frequency radiation:
  a pair of spaced electrodes;
  circuit means for applying electrical potential between said electrodes to produce short time duration arc discharges therebetween with the time between successive discharges being relatively long as compared to the time duration of a given arc discharge;
  first and second insulating members extending from one of said electrodes to the other with said second member completely surrounding said first member and separated therefrom to define an arc discharge passageway therebetween in which said arc discharges occur, said first member being partially transparent to the radiation of interest;
  a laserable material positioned substantially in coaxial alignment within said first member;
  at least one of said members having passageway wall portions which include an electric arc responsive gas evolving substance which is characterized in that the gases released therefrom, when heated by intense electrical discharge therethrough, emit intense black body radiation within a wavelength range which encompasses the wavelengths useful for pumping said laserable material, so that during each successive arc discharge said gases are pressurized within said passageway to temporarily provide a high temperature light source for radiation pumping said laserable material;
  and evacuation means including a continuously pumped plenum chamber sealing said passageway and exhausting the evolved gases from said passageway to provide a pressure substantially lower than atmospheric therein prior to the next successive arc discharge.

3. The invention according to claim 1 in which said evacuation means comprises a vacuum chamber having a relatively very large volume as compared to that of said passageway and a gas flow aperture communicating between said passageway and said vacuum chamber.

4. In an optical frequency radiation source:
  a pair of spaced electrodes;
  first and second elongate hollow insulating members positioned one within the other and defining therebetween a passageway which peripherally encompasses said first member and in which an electric arc occurs between said electrodes, said first member partially transparent to the radiation of interest;
  means sealing one end of said passageway;
  ballast means sealing the opposite end of said passageway and partially evacuating said passageway to pressures substantially lower than atmospheric prior to each successive electric arc discharge between said electrodes;
  a population inversion conditionable medium capable of simulated emission of coherent radiation positioned within said first member;
  partial reflectors positioned with respect to said medium to form an optical cavity therewith;
  means defining an aperture for substantially non-attenuative transmission of coherent radiation outwardly from said first member;
  with at least one of said insulating members including an electric arc responsive substance which is particularly characterized by copius evolution of gaseous arc products when subjected to contiguous electric arc discharge;
  and electrical energy storage circuit means for supplying potentials sufficient to initiate arc discharge within said passageway and currents sufficient to raise the evolved gases to produce black body temperatures of the order of at least 15,000° Kelvin within a time of the order of a few microseconds.

5. In an apparatus for generating short duration high intensity pulses of light energy;
  a pair of spaced electrodes;
  low inductance circuit means including a high capacitance condenser for repetitively producing between said electrodes arc discharges which individually involve dissipation of at least one thousands joules of electrical energy within time durations of the order of 20 to 100 microseconds;
  first and second hollow dielectric members extending between said electrodes and positioned one within the other for defining an arc discharge passageway therebetween, said members sealed at one end thereof;
  and ballast means sealing the other end of said member and exhausting arc products from said passageway during the time intervals between successive discharges and for evacuating said passageway to pressures substantially lower than atmospheric prior to each successive discharge; with at least one of said dielectric members including a gas evolving organic composition responsive to the heating action of contiguous electric arc discharge to release copius quantities of gaseous arc discharge products within said passageway in times of the order of a microsecond, whereby during each successive discharge said passageway is filled with ionized gases which are additionally heated and pressurized by electrical discharge therethrough in a manner to temporarily provide within said passageway a light emitting plasma which temporarily emits light energy having a spectral energy distribution approximating that of a black body radiator having a temperature of the order of at least 15,000° Kelvin.

6. In a light source adapted for pumping laserable material:
   a pair of spaced electrodes;
   a tubular member defining a sealed elongated cavity within which an electric discharge occurs between said electrodes;
   said member having wall portions formed of arc responsive gas evolving material characterized in that the gases released therefrom, when heated by intense electrical discharge therethrough, emit optical frequency radiation across a spectral continuum encompassing at least the wavelength range from about 3500 to 6000 A.;
   an elongate hollow insuating member formed of a material which is substantially transparent to radiation within said wavelength range positioned substantially centrally and in longitudinal alignment within said defined cavity for internally receiving a laserable material which is desired to be pumped by radiation emanating from the gases evolved in said cavity.

7. In a light source particularly adapted for generation of laser pumping radiation across the wavelength range from 3500 to 6000 Angstroms:
   a pair of spaced conductive electrodes;
   a substantially tubular first insulating member defining an elongated cavity within which an electric discharge occurs between said electrodes;
   an elongate hollow second insulating member formed of a material which is substantially transparent to radiation within said wavelength range positioned substantially centrally and in longitudinal alignment within said cavity for internally receiving a laserable material which is desired to be pumped by radiation emanating from the gases evolved in said cavity, said second insulating member forming a pressurizable passageway with said first insulating member;
   with at least one of said members having wall portions formed of arc responsive gas evolving material, said material being characterized in that the gases released therefrom, when heated by intense electrical discharge, emit optical frequency black body radiation across at least said wavelength range;
   and, ballast means including a chamber having a relatively very large volume compared to said passageway, connected to said formed passageway to enable pressurization of said passageway, said means also defining a gas flow conduit for rapid evacuation of evolved gas and arc discharge products from said passageway into said chamber, and means for maintaining a pressure substantially less than atmospheric in said chamber.

8. A light source comprising:
   a pair of spaced electrodes;
   a first dielectric member extending between said electrodes defining a cavity within which an arc discharge occurs between said electrodes;
   an elongate hollow dielectric member formed of a material which is substantially transparent to radiation within the wavelength range of interest positioned substantially centrally and in longitudinal alignment within said cavity for internally receiving a laserable material which is desired to be pumped by radiation emanating from the gases evolved in said cavity, said hollow dielectric member forming a pressurizable passageway with said first dielectric member;
   means, disposed in intimate relation with the arc path through said passageway, for evolution of light emitting gases in response to contiguous arc discharge;
   with at least one of said electrodes having an aperture for venting the evolved gases to limit gas pressure build up within said passageway;
   a ballast chamber communicating with said aperture for receiving gases vented from said passageway whereby the deposition of arc discharge products on the walls of said passageway is substantially avoided;
   and means for maintaining at least a partial vacuum in said chamber.

9. An electrical discharge light source comprising:
   a pair of spaced electrodes;
   a substantially tubular structure defining a pressurizable passageway in which a space discharge occurs between said electrodes;
   said structure having internal wall portions formed of a material which is characterized by copious evolution of gases in response to contiguous arc discharge and which is further characterized in that the gases so evolved, when heated by electrical discharge therethrough, emit black body radiation in the visible and ultraviolet regions;
   and an aperture extending through at least one of said electrodes for exhausting evolved gases from said structure whereby deleterious deposition of arc discharge products on the walls of said passageway is at least greatly reduced if not completely avoided;
   and an elongate dielectric member formed of light transparent material positioned substantially centrally within said passageway and having a longitudinal aperture for receiving a laserable material so that the same may be irradiated and pumped by light emanating from said gases.

10. A device for radiant energy pumping of laserable material comprising:
   a substantially cylindrical body formed of a solid, arc responsive, gas evolving material which is characterized in that the gases evolved therefrom, when heated by intense electrical discharge, emit radiation across a spectral continuum extending from about 3000 A. to at least about 6000 A. and having a spectral intensity distribution approximating that of a black body at a temperature of the order of at least 15,000° K.;
   said body having sealed end faces normal to the axis of symmetry and an elongated passageway extending axially through said faces;
   transparent insulating means for supporting a laserable material longitudinally within said passageway;
   first and second electrodes of substantially the same size as said passageway extending into the same from each end face sealing said passageway and having their inner ends in relatively far spaced opposition to form an elongated discharge gap;
   energy storage means including a high capacitance low inductance condenser for applying a sufficient potential to initiate an arc discharge along said passageway between said electrodes;
   one of said electrodes having an axial aperture extending therethrough for permitting discharge of evolved gases from said passageway to limit gas pressure build-up within said passageway and to substantially reduce deleterious condensation of arc discharge products on the walls of said passageway during the intervals between successive arc discharges.

11. In combination in a light source:
an at least partially evacuated ballast chamber;
an insulating member having an axially extending passageway;
means for providing an electric arc gas discharge longitudinally of at least a major portion of said passageway;
said means including first and second electrodes disposed in spaced apart relationship within said passageway, with at least said first electrode having an aperture to said passageway; means connecting said aperture to said evacuated chamber for exhausting gases and arc discharge products from said passageway to limit gas pressure build up in said passageway as the temperature therein increases and to at least substantially reduce the wall blackening which tends to arise from the condensation of arc discharge products on the walls of said passageway.

12. In combination:
a pair of spaced annular electrodes;
circuit means for applying potential between said electrodes to produce arc discharges therebetween with the time between successive discharges being relatively long as compared to the time duration of a given discharge;
first and second substantially coaxial insulating members extending from one of said electrodes to the other with said first member being positioned within said second member to define and form a pressurizable and substantially annular arc discharge passageway in which said arc discharges occur;
means for injecting a gas into said passageway;
evacuation means including a continuously pumped plenum chamber for exhausting the evolved gases from said passageway to provide a pressure substantially lower than atmospheric and to limit gas pressure buildup therein prior to the next successive arc discharge; and
a laserable material positioned substantially in coaxial alignment within said first member for receiving energy radiated from the ionized gases within said passageway.

13. In an apparatus for generating coherent optical frequency radiation:
a pair of spaced electrodes;
circuit means for applying electrical potential between said electrodes to produce short time duration arc discharges therebetween with the time between successive discharges being relatively long as compared to the time duration of a given arc discharge;
first and second insulating members extending from one of said electrodes to the other with said second member completely surrounding said first member and separated therefrom to define and form a pressurizable and arc discharge passageway therebetween in which said arc discharges occur;
means for injecting a gas into said passageway;
a laserable material positioned substantially in coaxial alignment within said first member;
and evacuation means including a continuously pumped plenum chamber for exhausting the evolved gases from said passageway to provide a pressure substantially lower than atmospheric and to limit gas pressure buildup therein prior to the next successive arc discharge.

14. An apparatus in accordance with claim 12 in which said plenum has a relatively very large volume as compared to that of said passageway.

15. In an optical frequency radiation source particularly adapted for pumping laserable material;
a pair of spaced electrodes;
first and second elongate hollow dielectric members positioned one within the other and defining therebetween a pressurizable passageway which completely surrounds said first member and in which an electric arc occurs between said electrodes;
ballast means for partially evacuating said passageway to pressures substantially lower than atmospheric prior to each successive electric arc discharge between said electrodes;
means for injecting a gas into said passageway;
a population inversion conditionable medium capable of stimulated emission of coherent radiation positioned within said first member;
means defining an aperture for substantially nonattenuative transmission of coherent radiation outwardly from said first member;
and circuit means for supplying potentials sufficient to initiate arc discharge within said passageway and currents sufficient to produce temperatures of the order of 15,000° Kelvin within a time of the order of a few microseconds.

16. In a light source particularly adapted for generation of laser pumping radiation across the wavelength range from 4000 to 6000 Angstroms:
a pair of spaced conductive electrodes;
a substantially tubular first dielectric member defining and forming a pressurizable and elongated cavity within which an electric discharge occurs between said electrodes;
an elongate hollow second dielectric member formed of a material which is substantially transparent to radiation within said wavelength range positioned substantially centrally and in longtudinal alignment within said cavity for internally receiving a laserable material which is desired to be pumped by radiation emanating from the gases evolved in said cavity and,
evacuation ballast means including a chamber having a relatively very large volume compared to said passageway, means defining a gas flow conduit for rapid evacuation of evolved gas and arc discharge products from said passageway into said chamber, and means for maintaining a pressure substantially less than atmospheric in said chamber.

17. Coherent radiation generating apparatus comprising:
an optical frequency resonance chamber having a length substantially greater than its transverse dimension;
a population inversionable medium located within said chamber and characterized by at least three distinct energy levels of which two have an energy separation in the frequency range within which said chamber resonates;
a substantially annular structure peripherally encompassing said chamber for illuminating said medium with pumping radiation so that a desired population inversion is ephemerally produced therein;
said illuminating structure comprising first and second substantially annular electrodes to which electrical energy is applied for supporting short duration high intensity annular arc discharges therebetween;
first and second substantially cylindrical hollow insulating members extending longitudinally intermediate said electrodes with said second member peripherally encompassing said population inversionable medium, and being positioned substantially coaxially within said first member in a manner to define and form a pressurizable and substantially annular arc discharge passageway between said electrodes at least one of said insulating members having wall portions formed of arc responsive gas evolving material;
said second member being formed of a material which is relatively transparent in the wavelength ranges useful for pumping said population inversionable medium and relatively non-transparent in at least some of the wavelength ranges which contribute to deleterious heating of said inversionable medium without usefully pumping the same;

first and second substantially coaxial elongated current return conductors positioned respectively outside said first insulating member and inside said second insulating member, with said conductors being connected together to said first electrode at one end and connected together at the other end in a manner to provide a pair of coaxial, electrically parallel arc discharge current return paths of approximately equal impedance whereby said annular arc discharges occupy an annular region of substantially zero net magnetic field so that pinch effect magnetohydrodynamic instabilities are minimized.

18. Coherent radiation generating apparatus comprising:
an optical frequency resonance chamber having a length substantially greater than its transverse dimension;
a population inversionable medium located within said chamber and characterized by at least three distinct energy levels of which two have an energy separation in the frequency range within which said chamber resonates;
a substantially annular structure peripherally encompassing said chamber for illuminating said medium with pumping radiation so that a desired population inversion is ephemerally produced therein;
said illuminating structure comprising first and second substantially annular electrodes to which electrical energy is applied for supporting short duration high intensity annular arc discharges therebetween;
first and second substantially cylindrical hollow insulating members extending longitudinally intermediate said electrodes with said second member peripherally encompassing said population inversionable medium, and being positioned substantially coaxially within said first member in a manner to define and form a pressurizable and substantially annular arc discharge passageway between said electrodes at least one of said insulating members having wall portions formed of arc responsive gas evolving material;
said second member being formed of a material which is relatively transparent in the wavelength ranges useful for pumping said population inversionable medium and relatively non-transparent in at least some of the wavelength ranges which contribute to deleterious heating of said inversionable medium without usefully pumping the same;
first and second substantially coaxial elongated current return conductors positioned respectively outside said first insulating member and inside said second insulating member, with said conductors being connected together to said first electrode at one end and connected together at the other end; and
first and second current in-lead conductors connected respectively, to said second electrode, and to said coaxial current return conductors at said other end of same.

19. Coherent radiation generating apparatus comprising:
an optical frequency resonance chamber having a length substantially greater than its transverse dimension;
a population inversionable medium located within said chamber and characterized by at least three distinct energy levels of which two have an energy separation in the frequency range within which said chamber resonates;
a substantially annular structure peripherally encompassing said chamber for illuminating said medium with pumping radiation so that a desired population inversion is ephemerally produced therein;
said illuminating structure comprising first and second substantially annular electrodes to which electrical energy is applied for supporting short duration high intensity annular arc discharges therebetween;
first and second substantially cylindrical hollow insulating members extending longitudinally intermediate said electrodes with said second member peripherally encompassing said population inversionable medium, and being positioned substantially coaxially within said first member in a manner to define and form a pressurizable and substantially annular arc discharge passageway between said electrodes at least one of said insulating members having wall portions formed of arc responsive gas evolving material;
said second member being formed of a material which is relatively transparent in the wavelength ranges useful for pumping said population inversionable medium and relatively non-transparent in at least some of the wavelength ranges which contribute to deleterious heating of said inversionable medium without usefully pumping the same;
first and second substantially coaxial elongated current return conductors positioned respectively outside said first insulating member and inside said second insulating member, with said conductors being connected together to said first electrode at one end and connected together at the other end with said first current return conductor comprising a substantially cylindrically metallic shield member peripherally enclosing said first insulating member for confining electromagnetic fields generated by said arc discharges to the region therewithin.

20. Coherent radiation generating apparatus comprising:
an optical frequency resonance chamber having a length substantially greater than its transverse dimension;
a population inversionable medium located within said chamber and characterized by at least three distinct energy levels of which two have an energy separation in the frequency range within which said chamber resonates;
a substantially annular structure peripherally encompassing said chamber for illuminating said medium with pumping radiation so that a desired population inversion is ephemerally produced therein;
said illuminating structure comprising first and second substantially annular electrodes to which electrical energy is applied for supporting short duration high intensity annular arc discharges therebetween;
first and second substantially cylindrical hollow insulating members extending longitudinally intermediate said electrodes with said second member peripherally encompassing said population inversionable medium, and being positioned substantially coaxially within said first member in a manner to define and form a pressurizable and substantially annular arc discharge passageway between said electrodes at least one of said insulating members having wall portions formed of arc responsive gas evolving material;
said second member being formed of a material which is relatively transparent in the wavelength ranges useful for pumping said population inversionable medium and relatively non-transparent in at least some of the wavelength ranges which contribute to deleterious heating of said inversionable medium without usefully pumping the same;
first and second substantially coaxial elongated current return conductors positioned respectively outside said first insulating member and inside said second insulating member, with said conductors being connected together to said first electrode at one end and connected together at the other end with at least one of said insulating members including an electric arc responsive gas evolving substance for self-filling said discharge passageway so that the same is enabled, within a time of the order of a microsecond after application of discharge potential, to support an ionized gas discharge current of at least several thousand amperes.

21. In combination:
a pair of spaced annular electrodes;

circuit means for applying potential between said electrodes to produce arc discharges therebetween with the time between successive discharges being relatively long as compared to the time duration of a given discharge;

first and second substantially coaxial insulating members extending from one of said electrodes to the other with said first member being positioned within said second member to define and form a pressurizable substantially annular arc discharge passageway in which said arc discharges occur;

at least one of said insulating members having passageway wall portions which include an electric arc responsive gas evolving substance for self-filling of said discharge passageway so that the same is enabled, within a time of the order of microseconds, to support an ionized gas discharged current of at least several thousand amperes;

evacuation means to provide a pressure substantially lower than atmospheric in said passageway prior to the next successive arc discharge; and a solid state laserable material having a length substantially greater than its transverse dimension positioned substantially coaxially within said first member and including an active laser media adapted for population inversion by the radiation emanating from said ionized gas;

with said laserable material having a plurality of peripherally spaced longitudinally extending slots in the surface thereof for suppressing stimulated emission oscillation in undesired circumferential ring modes which otherwise tends to occur in solid state lasers.

22. In combination:

a pair of spaced annular electrodes;

circuit means for applying potential between said electrodes to produce arc discharges therebetween with the time between successive discharges being relatively long as compared to the time duration of a given discharge;

first and second substantially coaxial insulating members extending from one of said electrodes to the other with said first member being positioned within said second member to define and form a pressurizable and substantially annular arc discharge passageway in which said arc discharges occur, at least one of said insulating members having wall portions formed of arc responsive gas evolving material; and a solid state laserable material having a length substantially greater than its transverse dimension positioned substantially coaxially within said first member, said laserable material adapted for population inversion by the radiation emanating from said ionized gas;

with said laserable material having a plurality of peripherally spaced longitudinally extending slots in the surface thereof for suppressing stimulated emission oscillation in undesired circumferential ring modes which otherwise tends to occur in solid state lasers.

23. In combination:

a pair of spaced annular electrodes;

circuit means for applying potential between said electrodes to produce arc discharges therebetween with the time between successive discharges being relatively long as compared to the time duration of a given discharge;

first and second substantially coaxial insulating members extending from one of said electrodes to the other with said first member being positioned within said second member to define and form a pressurizable and substantially annular arc discharge passageway in which said arc discharges occur at least one of said insulating members having wall portions formed of arc responsive gas evolving material;

a solid state laserable material having a length substantially greater than its transverse dimension positioned substantially coaxially within said first member and including an active laserable material adapted for population inversion by the radiation emanating from said ionized gas;

with said laserable material having embedded therein a plurality of longitudinally extending peripherally spaced rods formed of a material having a relatively high heat conductivity for cooling said laser element laserable material during the time intervals between successive arc discharges; and heat sink means coupled in heat conductive association with said rods.

24. In combination:

a pair of spaced annular electrodes;

circuit means for applying potential between said electrodes to produce arc discharges therebetween with the time between successive discharges being relatively long as compared to the time duration of a given discharge;

first and second substantially coaxial insulating members extending from one of said electrodes to the other with said first member being positioned within second member to define and form a pressurizable and substantially annular arc discharge passageway in which said arc discharges occur;

at least one of said insulating members having passageway wall portions which include and electric arc responsive gas evolving substance for self-filling of said discharge passageway so that the same is enabled, within a time of the order of microseconds, to support an ionized gas discharge current of at least several thousand amperes;

evacuation means to provide a pressure substantially lower than atmospheric in said passageway prior to the next successive arc discharge;

a solid state laserable material having a length substantially greater than its transverse dimension positioned substantially coaxially within said first member, said active laserable material adapted for population inversion by the radiation emanating from said ionized gas;

with said laserable material have embedded therein a plurality of peripherally spaced longitudinally extending slots in the surface thereof for suppressing stimulated emission oscillation in undesired circumferential ring modes which otherwise tends to occur in solid state lasers;

a like plurality of relatively high heat conductivity rods positioned in said slots and extending outwardly beyond at least one end of said laserable material; and cryogenically cooled heat sink means in thermal contact with outwardly extending portions of said rods.

25. In combination:

a pair of spaced annular electrodes;

circuit means for applying potential between said electrodes to produce arc discharges therebetween with the time between successive discharges being relatively long as compared to the time duration of a given discharge;

first and second substantially coaxial insulating members extending from one of said electrodes to the other with said first member being positioned within said second member to define and form a pressurizable and substantially annular arc discharge passageway in which said arc discharges occur;

at least one of said insulating members having passageway wall portions which include an electric arc responsive gas evolving substance for self-filling of said discharge passageway so that the same is enabled, within a time of the order of microseconds, to support an ionized gas discharge current of at least several thousand amperes;

evacuation means to provide a pressure substantially lower than atmospheric in said passageway prior to the next successive arc discharge;

a solid state laserable material having a length substantially greater than its transverse dimension positioned substantially coaxially within said first member said active laserable material adapted for population inversion by the radiation emanating from said ionized gas;

with said laserable material having embedded therein a plurality of peripherally spaced longitudinally extending slots in the surface thereof for suppressing stimulated emission oscillation in undesired circumferential ring modes which otherwise tends to occur in solid state lasers;

a like plurality of current carrying members positioned in said slots so as to extend outwardly beyond the ends of said laserable material with said current carrying members being electrically connected at one end to one of said electrodes and at the other end to one terminal of the current supplying circuit means so that said current carrying members form at least a portion of the arc discharge current return path and thereby substantially reduce the pinch effect magnetic forces which would otherwise tend to crush said first coaxial insulating member.

26. The invention according to claim 1 wherein said laserable material is:

substantially cylindrical in shape and formed of a transparent host material and including a population inversionable active media;

said laserable material also being formed to have a plurality of longitudinally extending peripherally spaced slots in the surface thereof for suppression of optical oscillation in undesired ring modes; and a like plurality of elongated rods disposed in said slots and extending longitudinally beyond at least one end of said laserable material.

27. The apparatus according to claim 2 in which said laser material is:

substantially cylindrical in shape and formed of a transparent host material and including a population inversionable active media;

said laserable material also being formed to have a plurality of longitudinally extending peripherally spaced slots in the surface thereof for suppression of optical oscillation in undesired ring modes; and a like plurality of elongated rods disposed in said slots and extending longitudinally beyond at least one end of said laserable material for conducting undesired heat energy longitudinally outward from said host material and simultaneously serving as an electromagnetic shield to at least partially exclude magnetic fields arising from the adjacent arc discharges whereby Zeeman splitting of the fluorescent levels of said active media is at least substantially reduced.

28. The invention according to claim 12 wherein said laserable material is:

shaped as an elongated substantially cylindrical member formed of a relatively transparent host material in which there is dispersed a relatively very small number of atoms of a population inversionable active media adapted for stimulated emission of coherent radiation, with said laserable material also being formed to define a plurality of peripherally spaced longitudinally extending slots in the surface thereof, and a like plurality of elongated conductors disposed in said slots for at least partially excluding externally generated magnetic fields from said member to thereby substantially eliminate Zeeman splitting of the fluorescent levels of said active media.

References Cited

UNITED STATES PATENTS

| 3,209,281 | 9/1965 | Colgate et al. | 331—94.5 |
| 3,262,004 | 7/1966 | Keller | 331—94.5 |

OTHER REFERENCES

Vogel et al., Laser: Devices and System—Part I, Electronics, vol. 34, No. 43 (October 1961) pp. 39–47.

JEWELL H. PEDERSEN, *Primary Examiner.*

W. L. SIKES, *Assistant Examiner.*